J. S DAVIS.
Seed-Planter
No. 21,187.
Patented Aug 17, 1858
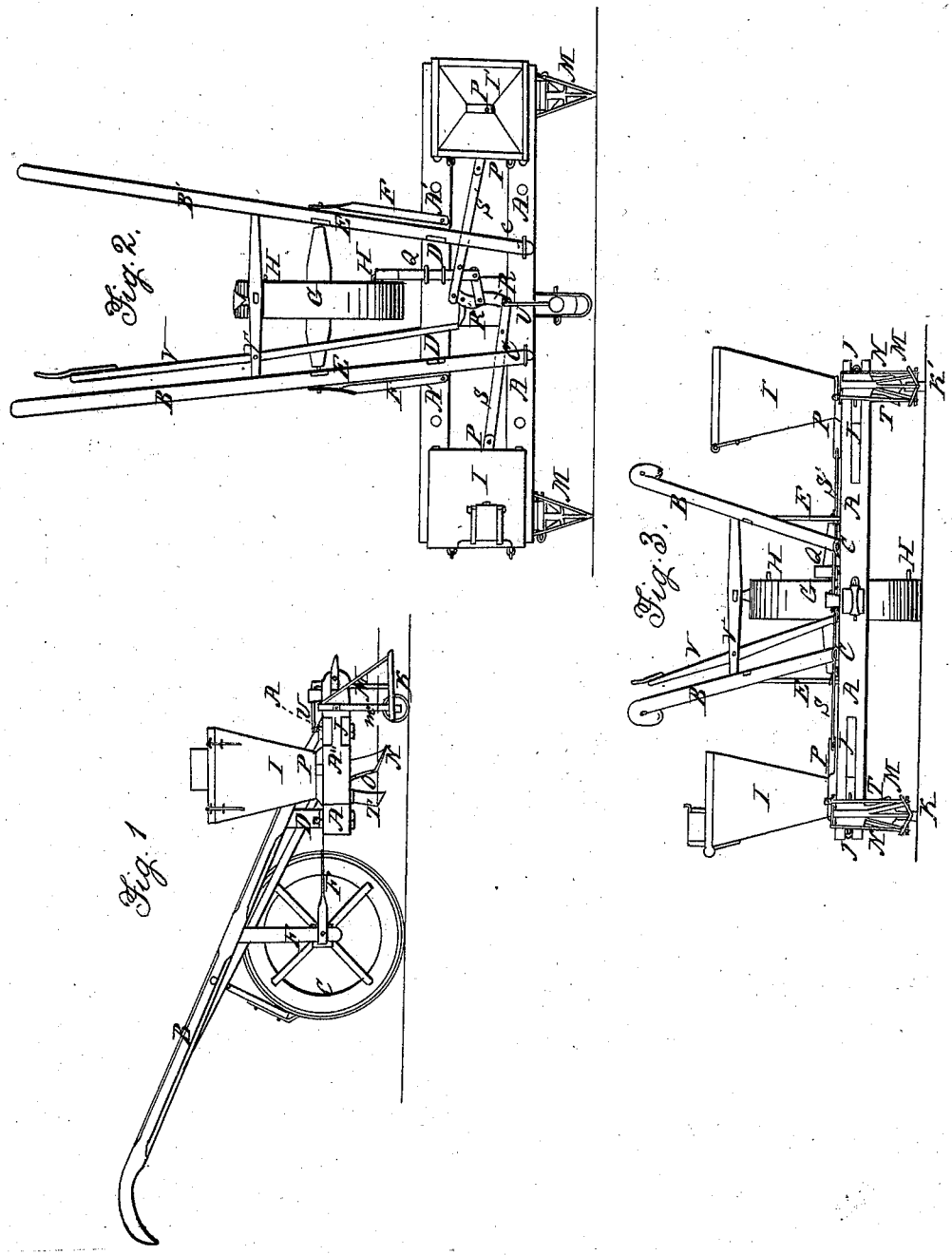

UNITED STATES PATENT OFFICE.

JOHN S. DAVIS, OF ARCADIA, OHIO.

IMPROVEMENT IN CORN-PLANTERS.

Specification forming part of Letters Patent No. 21,187, dated August 17, 1858.

*To all whom it may concern:*

Be it known that I, J. S. DAVIS, of Arcadia, in the county of Hancock and State of Ohio, have invented new and useful Improvements in Seeding-Machines; and I do hereby declare the following to be a full and complete description of the construction and operation of the same, reference being had to the accompanying drawings, in which—

Figure 1 is a side view of my improved seeding-machine; Fig. 2, a top view, and Fig. 3 a front view, of the same.

Like letters refer to like parts in the different views.

A A' A'' in the several figures represent the frame of the machine. This consists of two pieces of timber whose length is equal to the width of the machine—say, four feet. These pieces are framed together and held in place about one foot apart by a short girth, A'', in the middle and at each end, the end girths being adjustable toward the center, for purposes hereinafter described.

The handles are seen at B B'. These are attached to the frame at C C by means of a clasp, bolt, or staple inserted into the frame-timber A. The handles are supported from the frame-timber A' by braces D D, which are of sufficient length to elevate the handles to an angle of about forty degrees, as seen in Fig. 1.

At E is shown a brace extending downward from the handles, that supports the main wheel of the machine. At the lower end of this brace E a rod, F, extends forward to the frame-piece A', for the purpose of given it a firm support. The wheel G supports about half the weight of the machine, and by depressing the handles B forms a fulcrum by means of which the operator is enabled to raise the forward part of the machine from the ground in turning around. The wheel G also acts by means of pins (seen at H) upon the feeding apparatus, and discharges the grain at certain intervals, as hereinafter described. There are two hoppers or chests, I I', for containing the seed to be sown. The one shown at I', Fig. 2, is shown without the cover, for the purpose of showing the interior and the valve for distributing the seed. These hoppers are mounted upon the cross-girths A'', which can be adjusted laterally in the long mortise J, Fig. 3, for the purpose of making the rows wider apart or nearer together.

The forward end of the machine is supported upon two small truck-wheels, K K', Figs. 1 and 3. These wheels are attached to adjustable guards M, which, when adjusted for use, clear away the clods, stones, and other obstructions from the teeth that make the furrow for the grain. When these guards are adjusted, as seen in Fig. 1, the machine is in a condition for moving over the ground without planting, the furrow-teeth N being raised above the ground. In a condition for planting the guard M is raised to the red line in Fig. 1, and the bolt that fastens it to the forward end of the girth A'' passed through the hole m in Fig. 1, both the guards M are thus arranged for planting, in which condition the furrow-teeth will both enter the ground to a depth sufficient for the seeds to become well covered, the truck-wheels K K' at the same time resting upon the soil in front of the teeth N. The weight of the machine is thereby supported and the teeth N prevented from penetrating the ground too deeply.

The seeds are discharged from the hoppers I I' through spouts O O, inserted into the bottom of each hopper, and covered by slide-valves P P. The slide-valve is worked by the pin H acting upon an inclined plane upon the back end of the rod Q, which vibrates the double lever R R simultaneously, opening and closing the valves P by means of the connecting-rods S S'. These connecting-rods can be shortened at pleasure to correspond to the position of the hoppers in regard to their distance from each other. The deposited seeds are covered by means of two blades which stand with the wings inclined a little outward, but one of which is shown in the drawings at T, Fig. 1, the inner ones being shown at T' in Fig. 3. The interval in the deposition of the seed is regulated by the distance or number of the pins H in the wheel G. If there is but one pin, seeds are deposited at every revolution of the wheel. If two pins are inserted at equal distances, the seeds will be deposited twice at every revolution, and so on. When the valves have been moved by the action of the lever R the spring U brings the valves back to their original position and closes the orifice through which the seeds pass. Should it be desirable to plant corn in rows both ways across the field, the pins H are all to be removed from the wheel G and the ground furrowed or marked in one direction. The operator can at pleasure drop the seeds in these furrows by causing the machine to be drawn across at right angles thereto, and by a sudden movement toward the handle B of the lever V, whose fulcrum is at V', the valves P are opened and the seed deposited in the furrow. By repeating this movement at the moment the tube O passes the furrow rows are planted in both directions. The adjustable guards M and trucks K move laterally with the hoppers, being connected to the piece A" to which the hoppers are secured, so that the hoppers and adjustable guards will always have the same relative position to each other.

What I claim as my improvement, and desire to secure by Letters Patent, is—

The adjustable guards M, truck K, and adjustable hoppers I, in combination with the adjustable connecting-rods S S, lever R, and rod Q, the whole combined and operating in the manner described, and for the purpose set forth.

JOHN S. DAVIS.

Witnesses:
I. BRAINERD,
W. H. BURRIDGE.